(12) United States Patent
Fields et al.

(10) Patent No.: US 7,457,695 B1
(45) Date of Patent: Nov. 25, 2008

(54) PORTABLE, SELF-CONTAINED VEHICLE SEAT OCCUPANCY ALERT DEVICE

(76) Inventors: Marvin Fields, 1051 Christina St., Fayetteville, NC (US) 28314; Lisha Fields, 1051 Christina St., Fayetteville, NC (US) 28314

( * ) Notice: Subject to any disclaimer, the term of this patent is extended or adjusted under 35 U.S.C. 154(b) by 263 days.

(21) Appl. No.: 11/224,561

(22) Filed: Sep. 12, 2005

(51) Int. Cl.
*G06F 7/00* (2006.01)
(52) U.S. Cl. .............................. 701/36; 701/33; 701/45; 340/425.5; 340/438; 180/271; 180/272; 180/273
(58) Field of Classification Search .................... 701/33, 701/36, 45; 340/425.5, 438; 180/268, 269, 180/271, 272, 273
See application file for complete search history.

(56) References Cited

U.S. PATENT DOCUMENTS

| | | | |
|---|---|---|---|
| 5,260,684 A * | 11/1993 | Metzmaker | 340/457.1 |
| 5,924,767 A * | 7/1999 | Pietryga | 297/180.13 |
| 6,104,293 A | 8/2000 | Rossi | |
| 6,714,132 B2 | 3/2004 | Edwards et al. | |
| 6,812,844 B1 | 11/2004 | Burgess | |
| 6,870,472 B2 | 3/2005 | Gift et al. | |
| 6,909,365 B2 | 6/2005 | Toles | |
| 7,348,889 B2 * | 3/2008 | Monzo et al. | 340/573.1 |
| 2003/0222775 A1 | 12/2003 | Rackham et al. | |
| 2004/0145456 A1 * | 7/2004 | Mattes et al. | 340/425.5 |
| 2004/0164856 A1 | 8/2004 | Mesina | |
| 2005/0057350 A1 | 3/2005 | Younse | |

* cited by examiner

*Primary Examiner*—Gertrude Arthur Jeanglaud
(74) *Attorney, Agent, or Firm*—Coats & Bennett, P.L.L.C.

(57) ABSTRACT

A portable, self-contained vehicle seat occupancy alert device alerts a person (e.g., the vehicle operator) upon exiting a vehicle seat. The alert serves to remind the person of the presence of passengers or cargo upon the person exiting the vehicle. The alert device comprises a pad placed between a person and the vehicle seat. One or more pressure sensors disposed within the pad are operative to detect the presence or absence of a person in a vehicle seat. An alarm is armed upon a sensor detecting the presence of a person in a vehicle seat, and is operative to emit a warning upon a sensor detecting the absence of the person from the vehicle seat. Thus, wherever the person exits the vehicle seat, the alarm emits a warning, reminding the person to check for passengers or cargo that needs to be removed from the vehicle.

20 Claims, 5 Drawing Sheets

US 7,457,695 B1

PORTABLE, SELF-CONTAINED VEHICLE SEAT OCCUPANCY ALERT DEVICE

FIELD OF THE INVENTION

The present invention relates generally to the field of vehicles and in particular to a portable, self-contained vehicle seat occupancy alert device.

BACKGROUND

A child being unintentionally left in a vehicle is an all too common occurrence—often with tragic results. Busy, forgetful, or traffic-stressed parents, day care workers, or other adults may simply forget a child is strapped into a child safety seat, or buckled into a vehicle seat, in an automobile or on a bus. Children often fall asleep in the seats, and are unable to alert the adult to their presence. Additionally, animals may sleep in the floorboard area, and an adult may forget and leave them trapped in the vehicle. A child or animal locked into an automobile, van, or bus on a hot day can die within hours.

One test monitored the interior temperature rise in two parked cars—a dark sedan with the windows closed and a light minivan with the windows open approximately 1.5 inches—on an afternoon with an ambient exterior air temperature of 93° F. Within 20 minutes, temperature readings in both cars exceeded 125° F. and reached approximately 140° F. in 40 minutes—a temperature rise of over 45° F. As this test shows, contrary to popular belief, "cracking" the vehicle windows in an attempt to allow ventilation while deterring entry from outside, is ineffective in protecting children or animals in the vehicle from the danger of heat stroke (Gibbs, et al., Heat Exposure in an Enclosed Automobile, Journal of the Louisiana State Medical Society. Volume 147 (12) 1995).

A variety of child safety seat occupancy sensors and alarms, designed to alert drivers to the presence of children in a vehicle, are known in the art. U.S. Pat. No. 6,909,365 discloses an alarm system comprising a switch operative to detect a child occupying a child safety seat, a sensor that detects when the ignition key of the vehicle is in an off position, and an alarm that triggers if the child seat is occupied when the ignition is turned off. U.S. Pat. No. 6,870,472 discloses a sensor for detecting when a child safety seat is occupied; a light sensor detects the state of the vehicle's dome light, indicating an open door. If a door is opened while the seat is occupied, an alarm sounds. U.S. Pat. No. 6,812,844 detects occupancy of the child safety seat by detecting whether the retention strap buckle is engaged, and discloses an air pressure transducer to detect when a door is opened.

These prior art child seat occupancy detection and alarm systems are deficient in several respects. The systems that detect occupancy of a child safety seat must generally be designed into the seat, and installed at the time of manufacture. While this may address the problem in the future, millions of child safety seats that lack such detectors are in use daily, potentially putting children at risk of being inadvertently left in a vehicle. Furthermore, even if a means is devised to upgrade existing child safety seats to include occupancy sensors, such sensors must be installed in every safety seat in which any child may ride. For a family with two or three infants or small children, or a child care facility that owns a plurality of safety seats, this multiplies the cost by each additional safety seat that must be upgraded.

Most of the prior art alarm systems additionally require some modification to the automobile, such as to detect whether a door is opened, the state of the ignition switch, or the like. Again, such sensors are either not designed into vehicles, or the outputs of sensors that are designed in are not readily available; hence existing vehicles must undergo potentially expensive modifications to accommodate the prior art alarms. In addition, once the modifications are performed, the alarm is only operative in the vehicle to which the modifications were made. Many families, child care centers, schools, churches, and the like may transport children in numerous vehicles.

Thus, a need exists in the art for a portable, self-contained system that is effective to alert, or remind, adults to the presence of passengers, including infants, children, and animals, upon exiting a vehicle. Such an alarm should be fully functional when placed in any vehicle, requiring no modification to either the child safety seat or the vehicle. Furthermore, a single alarm would ideally remind the adult of the presence of any child in the automobile, regardless of the number of child safety seats or which ones are occupied. In addition, it would be advantageous to utilize the alarm to remind the adult of other cargo, for example, perishable groceries that must be unloaded from the trunk, upon exiting the vehicle.

SUMMARY

According to one or more embodiments, the present invention relates to a portable, self-contained vehicle seat occupancy alert device that alerts a person (e.g., the vehicle operator) upon exiting a vehicle seat. The alert serves to remind the person of the presence of passengers or cargo upon the person exiting the vehicle. The alert device comprises a pad placed between a person and the vehicle seat. One or more pressure sensors disposed within the pad are operative to detect the presence or absence of a person in a vehicle seat. An alarm is armed upon a sensor detecting the presence of a person in a vehicle seat, and is operative to emit a warning upon a sensor detecting the absence of the person from the vehicle seat. Thus, wherever the person exits the vehicle seat, the alarm emits a warning, reminding the person to check for passengers or cargo that needs to be removed from the vehicle.

In one embodiment, the pad rests between the person and the front surface of the back portion of a vehicle seat. In this embodiment, a counterweight, attached to the pad by straps, may hang over the rear surface of the back portion of the vehicle seat. In another embodiment, the pad rests on the seat portion of the vehicle seat.

The present invention also relates to a method of reminding a vehicle operator to remove passengers and/or cargo from a vehicle upon exiting the vehicle. A portable, self-contained vehicle seat occupancy alert device operative to arm upon detecting the presence of a person in a vehicle seat, and operative to emit a warning upon detecting the absence of the person from the vehicle seat, is placed on a vehicle seat prior to entering the vehicle. The person enters the vehicle and thereby activates the vehicle seat occupancy alert device. Upon exiting the vehicle, in response to a warning emitted by the vehicle seat occupancy alert device, the person removes passengers and/or cargo from the vehicle.

DETAILED DESCRIPTION

Figure 1:
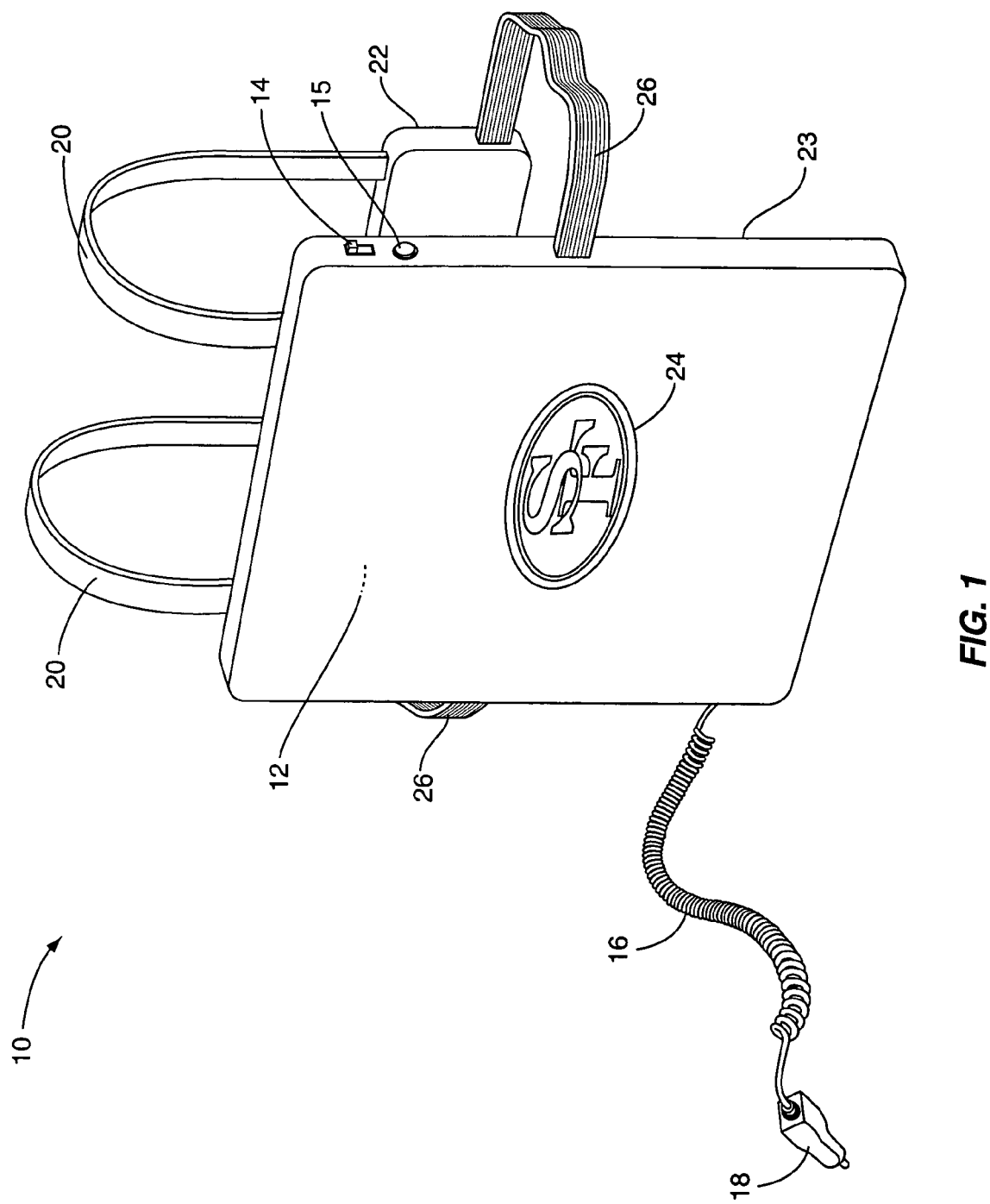
FIG. 1 is a portable, self-contained vehicle seat occupancy alert device for the back portion of a vehicle seat.

FIG. 1 depicts a portable, self-contained vehicle seat occupancy alert device according to one embodiment of the present invention, depicted generally by the numeral 10. The device comprises a pad 12 that rests between a person and the front surface of the back portion of a vehicle seat. The pad 12 includes an ON/OFF switch 14, and may additionally include a RESET button 15. In one embodiment, the pad 12 may include a power cord 16 attached to the pad 12 at one end, and terminating at the other end in a male power plug 18. The plug 18 may be of the type operative to mate with a female accessory power outlet provided in many vehicles (also known as a cigarette lighter outlet). In the embodiments in which the power cord 16 and power plug 18 are provided, the power cord 16 may be permanently attached to the pad 12, or it may be removable, such as via any two-conductor plug (not shown) known in the art.

The pad 12 is connected by two straps 20 to a counterweight 22. The counterweight 22 hangs over the rear surface of the back portion of a vehicle seat. The straps 20 are spaced apart, and allow the alert device 10 to be installed over the back portion of a vehicle seat, with the straps 20 disposed to either side of a vehicle seat headrest. The straps 20 are preferably adjustable in length.

The pad 12 and/or the counterweight 22 may include an outer covering 23 of cloth, vinyl, leather, suede, or the like. In one embodiment, the covering 23 may be formed of a high-visibility, fluorescent color material, to maximize its conspicuity and hence its function as a reminder. In another embodiment, the covering 23 may be formed of a color and pattern to match or complement the vehicle's interior décor. In various embodiments, the covering 23 may include a graphic insignia 24. The insignia 24 may for example comprise a sports team logo, vehicle marques graphic, or the like.

In one embodiment, particularly suitable for "bucket" type vehicle seats, the device 10 includes straps 26 connecting the pad 12 to the counterweight 22. The straps 26 may be formed of an elastic type material, and/or may include hook-and-loop fasteners, or other means to readily adjust their length. The straps 26 may more securely hold the pad 12 in place against the front surface of the back portion of a vehicle seat.

Figure 2:
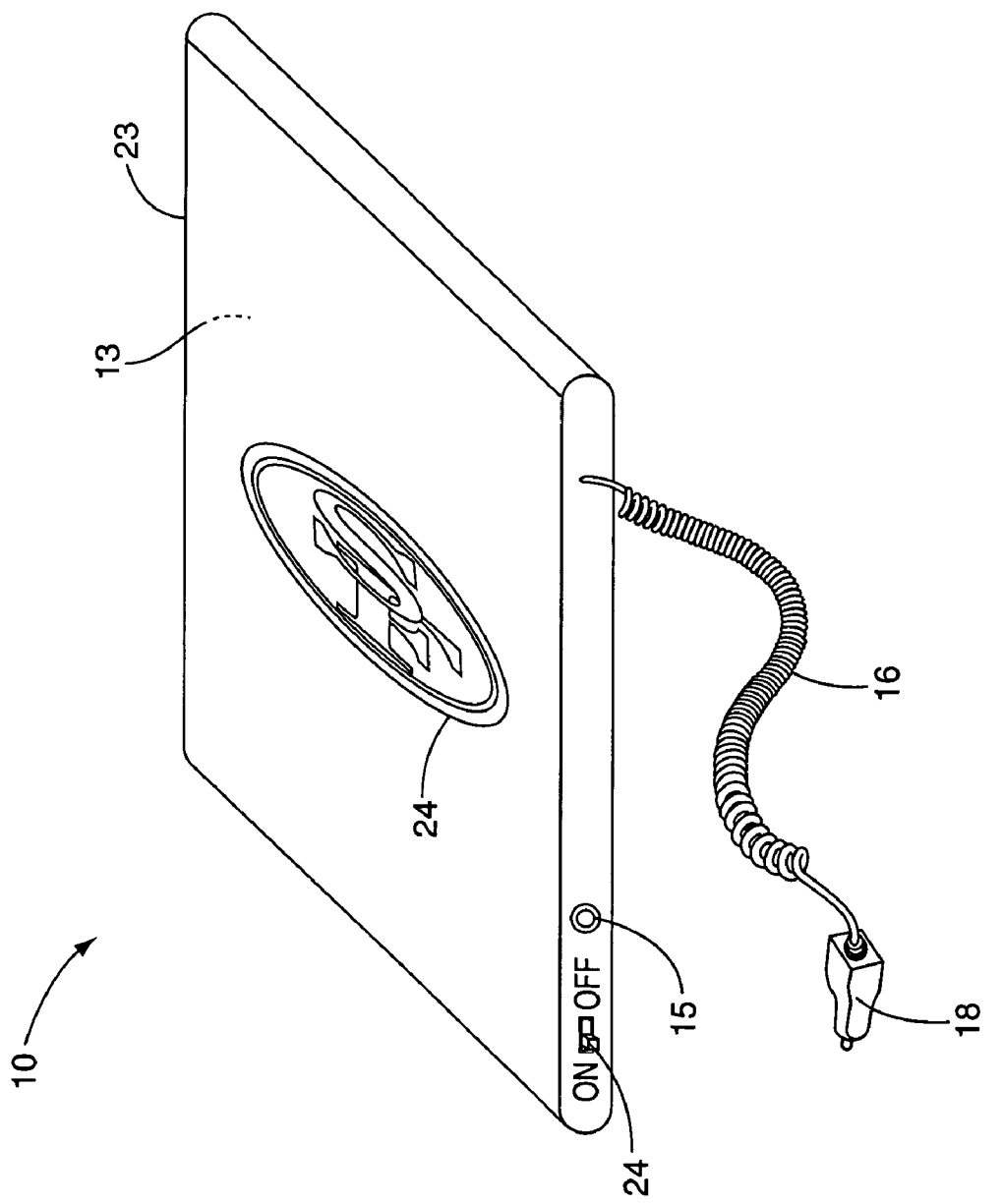
FIG. 2 is a portable, self-contained vehicle seat occupancy alert device for the seat portion of a vehicle seat.

FIG. 2 depicts another embodiment of the portable, self-contained vehicle seat occupancy alert device 10 of the present invention. In this embodiment, the device 10 comprises a pad 13 that is placed over the seat portion of a vehicle seat, with a person sitting upon the pad 13 upon entering the vehicle. The pad 13 is substantially similar to the pad 12 described above. In various embodiments, the pad 13 may include an ON/OFF switch 14, RESET switch 15, fixed or removable power cord 16 and power plug 18. The covering 23 may be as described above with reference to the pad 12, and may optionally include a graphic insignia 24.

Figure 3:
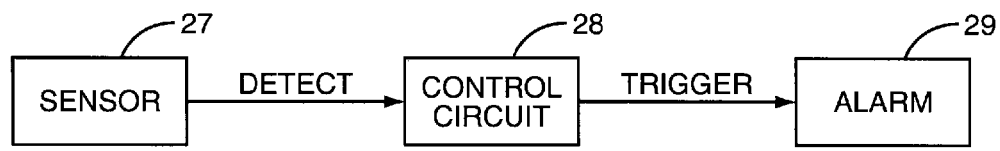
FIG. 3 is a block diagram of the alert device electronics.

In all embodiments, electronic circuits are disposed within the pad 12, 13, as represented in block diagram form in FIG. 3. One or more pressure sensors 27 are operative to detect the presence of a person by virtue of the force exerted by the person's body against the pad 12, 13 when seated in a vehicle seat. The pressure sensors 27 may comprise a sensor comprising a spiral or otherwise serpentine conductor maintained in spaced apart relationship with an overlying conductive surface. Pressure on the sensor 27 results in contact between at least portions of the conductor and the overlying conductive surface. Alternatively, pressure sensors 27 may comprise conventional push-button type switch mechanisms, limit switches, or other pressure-actuated sensors or switches, as well known in the art.

The sensors 27 output a DETECT signal to a control circuit 28 when one or more of the sensors 27 detect the presence of a person in a vehicle seat via pressure exerted on the pad 12, 13. The control circuit 28 may arm upon the initial assertion of the DETECT signal, and may emit an audible and/or visual warning upon the subsequent deassertion of the SELECT signal (indicating that a person has exited a vehicle seat). In one embodiment, as depicted in FIG. 3, the control circuit 28 emits a warning by asserting a TRIGGER signal to an alarm module 29. The alarm module 29 may include a speaker, piezoelectric transducer, or other audible source. The alarm module 29 may alternatively or additionally include one or more light bulbs, LEDs, or other visual indicators, and the control circuits necessary to drive them. For example, the alarm module 29 may include an array of LEDs, which may illuminate, flash, exhibit a "chasing" light pattern, or present some other attention-gathering visual display.

Figure 4:
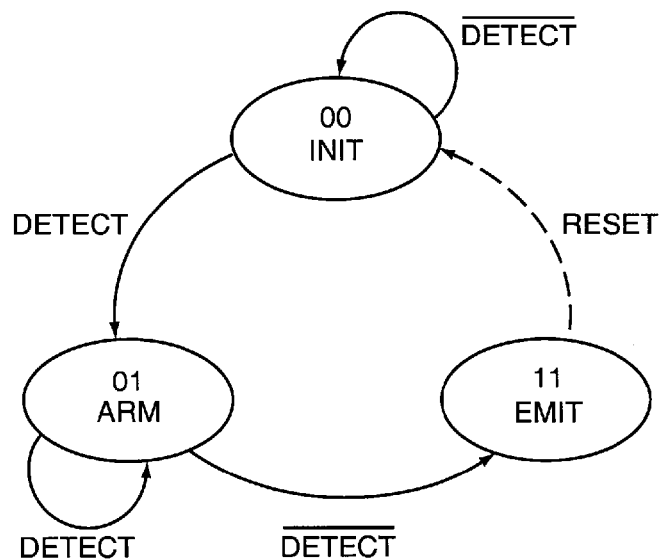
FIG. 4 is a state diagram.

As an illustrative example only, the control circuit 28 may implement a simple state machine, as depicted in FIG. 4. Initially, upon Power on Reset (POR), and additionally upon a user-actuated RESET in some embodiments, an INIT state (state bits 00) is entered. The INIT state is maintained as long as no person is detected occupying the vehicle seat. When one or more sensors detect a person, the sensor module 27 sends a DETECT signal to the control circuit 28, transitioning the state machine to an ARM state (state bits 01). The ARM state is maintained as long as the DETECT signal from the sensor module 27 is asserted. That is, the control circuit 28 maintains the ARM state while a person is seated in the vehicle seat. When the sensor indicates that the person's body is no longer pressing against the pad 12, 13, the DETECT signal is deasserted and the control circuit 28 transitions to the EMIT state (state bits 11). In the EMIT state, a TRIGGER signal is asserted to the alarm module 29, causing an audible and/or visual warning to be emitted. In those embodiment where a reset switch 15 is provided, the user may actuate the reset switch 15 and transition the controller from the EMIT state to the INIT state. Alternatively, the user may simply actuate the ON/OFF switch 14 and turn off the alert device 10.

Figure 5:
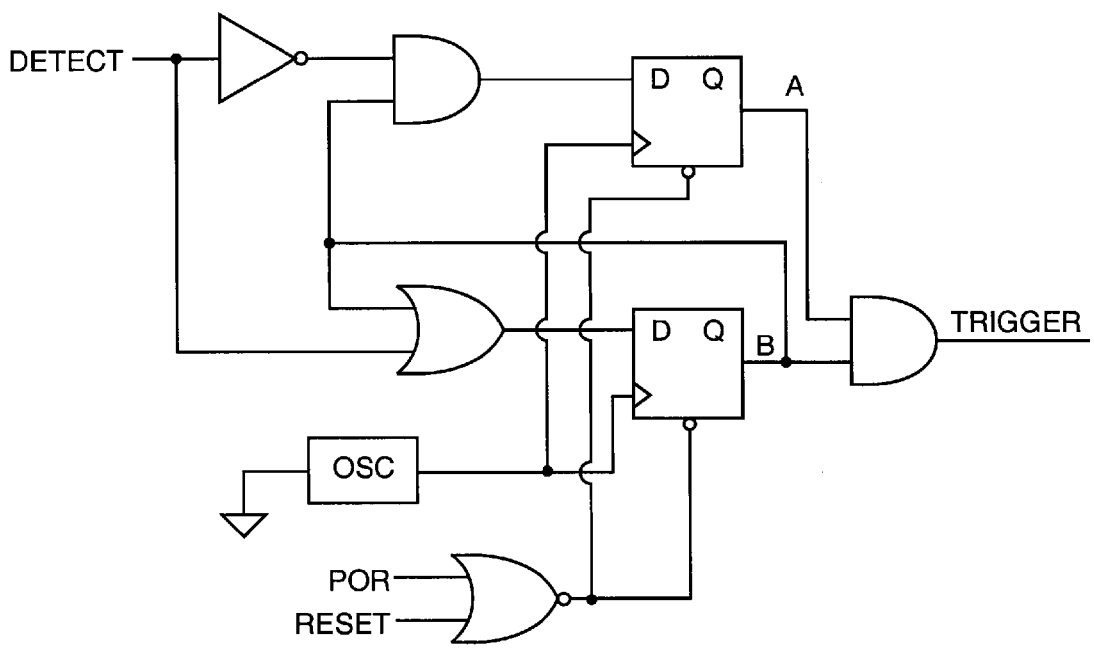
FIG. 5 is a circuit schematic.

FIG. 5 depicts one representative implementation of the control circuit 28, comprising discrete logic circuits. In practice, the state machine of FIG. 3 (or other specification of the desired functionality, such as program code) may be implemented in discrete logic circuits, via a microprocessor or microcontroller, within a programmable logic circuit, or in a wide variety of ways, as well known by those of skill in the art.

Figure 6:
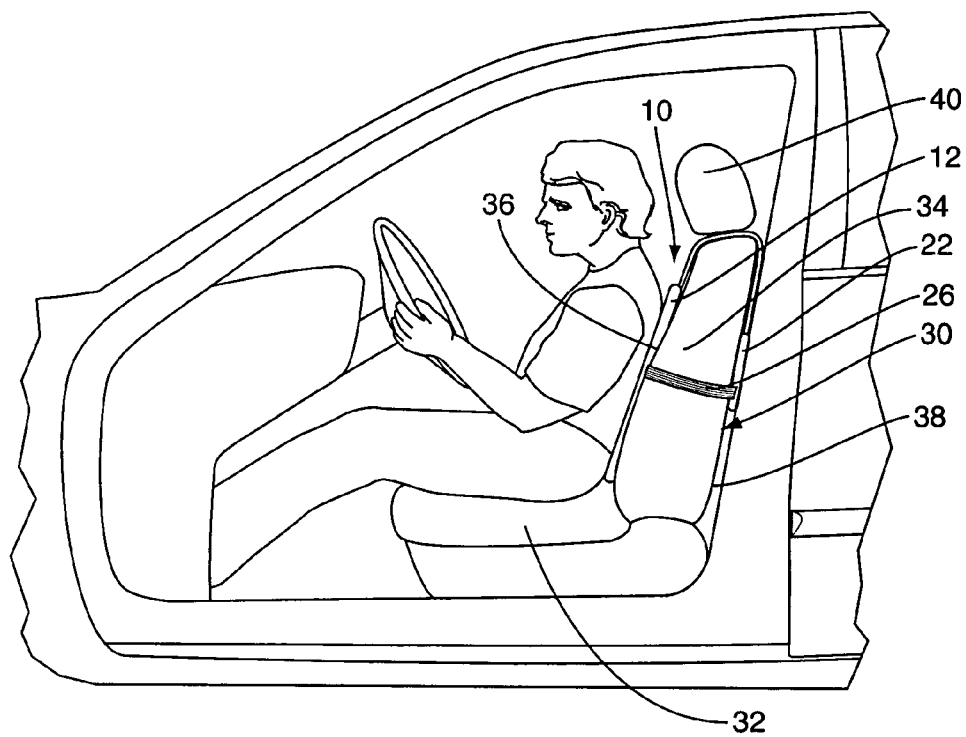
FIG. 6 depicts the embodiment of FIG. 1 in use in a vehicle.

FIG. 6 depicts the embodiment of FIG. 1 in use in a vehicle. A person sits in the vehicle seat 30, which comprises a seat portion 32 and back portion 34. The pad 12 of the alert device 10 is positioned between the person and the front surface 36 of the back portion 34 of the seat 30. The counterweight 22, connected by straps 20 that straddle the headrest 40, hangs over the rear surface 38 of the back portion 34 of the seat 30. In some embodiments, such as in a vehicle with bucket seats, straps 28 further secure the pad 20 and the counterweight 22 together around the sides of the back portion 34 of the seat 30. As the person leans against the back portion 34 of the seat 30, he or she contacts the pad 12, actuating sensors located therein and arming the alarm. When the person exits the vehicle, or in some cases when he or she leans forward to turn off the ignition and retrieve the keys, the cessation of pressure against the pad 12 causes the sensors to detect the absence of the person, triggering the alarm to emit an audible and/or visual alarm.

Figure 7:
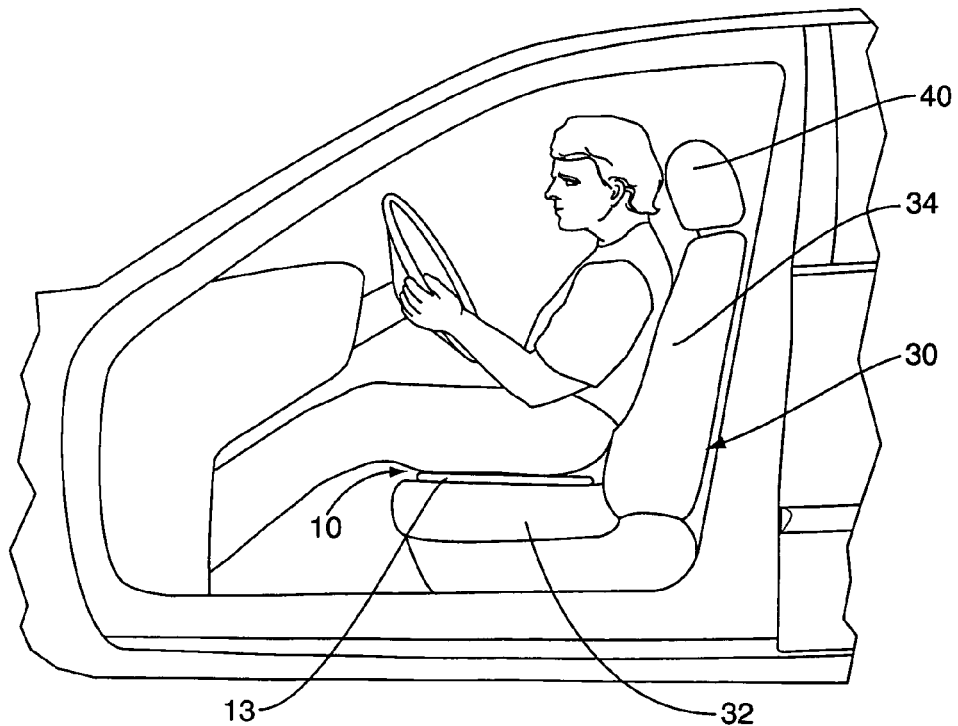
FIG. 7 depicts the embodiment of FIG. 2 in use in a vehicle.

FIG. 7 depicts the embodiment of FIG. 2 in use in a vehicle. The pad 13 is placed over the seat portion 32 of the vehicle seat 30. When the person enters the vehicle, his or her weight on the pad 13 triggers one or more sensors disposed within the pad 13, arming the alarm. When the person exits the vehicle, the removal of weight from the pad 13 is sensed by sensors, and the alarm is triggered to emit an audible and/or visible warning.

Figure 8:
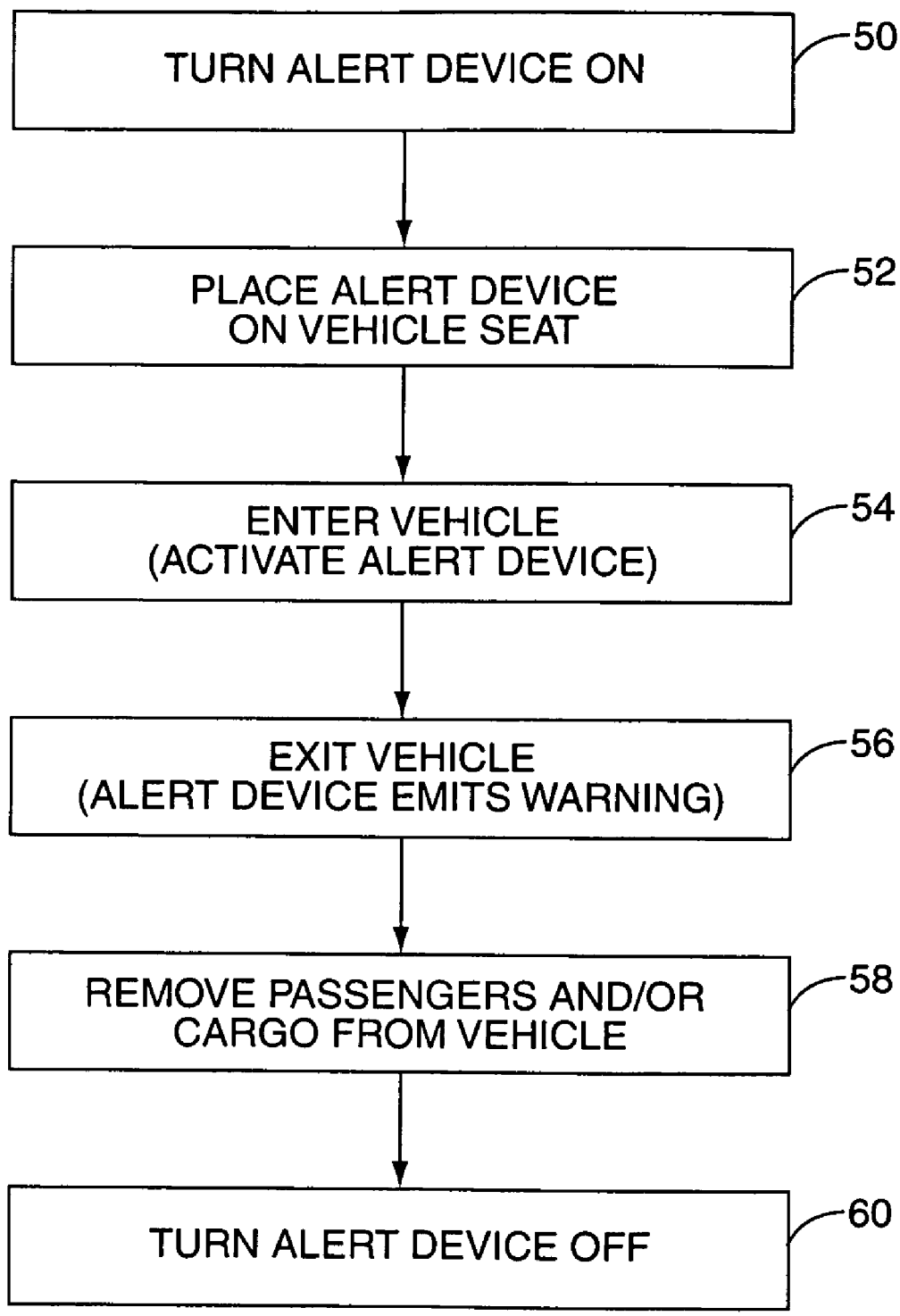
FIG. 8 is flow diagram of a method of reminding a vehicle operator to remove passengers and/or cargo from a vehicle upon exiting the vehicle.

FIG. 8 depicts, in flow diagram form, a method of reminding a person to retrieve passengers and/or cargo from a vehicle. Prior to entering the vehicle, the person turns the alarm on (Block 50), and places the alarm on the vehicle seat (Block 52). Depending on the embodiment of the present invention, this may comprise hanging the pad 12 over the front surface 36 of the rear portion 34 of the vehicle seat 30, with a counterweight 22 hanging over the rear surface 38 of the back portion 34 of the vehicle seat 30. Alternatively, it may comprise placing the pad 13 on the seat portion 32 of the vehicle seat 30. Additionally, in some embodiments, the person may insert an attached power plug 18 into a corresponding accessory power outlet in the vehicle, to provide power to the alert device 10.

The person then enters the vehicle (Block 54), exerting pressure on the pad 12, 13 that triggers one or more sensors within the pad 12, 13, and arms the alarm. The person then operates the vehicle in a conventional manner. Upon reaching his or her destination, the person exits the vehicle (Block 56). This removes pressure from the pad 12, 13, which is sensed by one or more sensors disposed within the pad 12, 13, and triggers the alert device 10 to emit an audible and/or visual warning. Upon hearing and/or seeing the warning, the person is reminded to remove passengers and/or cargo from the vehicle (Block 58). The person may then turn the alarm off (Block 60), or in some embodiments, reset it.

The alert device 10 may easily be removed from the vehicle and stored (e.g. in the trunk), or alternatively may be left within the vehicle. The alert device 10 may remain in the vehicle, with the person activating the alert device 10 only on trips where there is some danger of neglecting to remove passenger and/or cargo upon reaching a destination. Alternatively, the entire portable, self-contained vehicle seat occupancy alert device 10 may be removed, and only deployed in the vehicle seat for those trips in which the person needs a reminder.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A portable, self-contained vehicle seat occupancy alert device, comprising:
   a pad capable of being placed between a person and a vehicle seat;
   one or more pressure sensors disposed in the pad and operative to detect the presence of a person in the vehicle seat and further operative to detect the absence of a person from the vehicle seat; and
   an alarm disposed in the pad, armed upon a sensor detecting the presence of a person in a vehicle seat, and operative to emit a warning upon a sensor detecting the absence of the person from the vehicle seat.

2. The device of claim 1 wherein the pad is disposed between the person and the seat portion of the vehicle seat.

3. The device of claim 2 wherein the pad is disposed between the person and the back portion of the vehicle seat.

4. The device of claim 3 further comprising a counterweight and strap members connecting the counterweight to the pad, the counterweight operative to hang over the rear surface of the back portion of the vehicle seat when the pad hangs over the front surface of the back portion of the vehicle seat.

5. The device of claim 4 further comprising one or more straps operative to connect the pad and counterweight around the sides of the back portion of the vehicle seat.

6. The device of claim 3 wherein the pad comprises an outer cover of a high-visibility, fluorescent color.

7. The device of claim 3 wherein the pad comprises an outer cover generally compatible with the vehicle interior décor.

8. The device of claim 3 wherein the pad comprises an outer cover having a graphic indicia formed thereon.

9. The device of claim 1 wherein the pressure sensor comprises a serpentine conductor overlaid in spaced relationship with a conductive surface.

10. The device of claim 1 wherein the pressure sensor comprises a pressure-actuated switch.

11. The device of claim 1 further comprising an audible transducer, and wherein the warning is audible.

12. The device of claim 1 further comprising one or more LEDs, and wherein the warning is visible.

13. The alarm of claim 1 further comprising a replaceable battery providing power to the alarm.

14. The device of claim 1 further comprising a wired connection to a male accessory plug operative to receive power from a female accessory outlet in the vehicle.

15. A method of reminding a vehicle operator to remove passengers and/or cargo from a vehicle upon exiting the vehicle, comprising:
   placing a portable, self-contained vehicle seat occupancy alert device on a vehicle seat prior to entering the vehicle, the vehicle seat occupancy alert device operative to arm upon detecting the presence of a person in a vehicle seat, and operative to emit a warning upon detecting the absence of the person from the vehicle seat;
   entering the vehicle and thereby arming the vehicle seat occupancy alert device;
   exiting the vehicle and thereby causing the vehicle seat occupancy alert device to emit a warning; and
   in response to the warning, removing passengers and/or cargo from the vehicle.

16. The method of claim 15 further comprising:
   prior to entering the vehicle, enabling the vehicle seat occupancy alert device; and
   in response to the warning, disabling the vehicle seat occupancy alert device.

17. The method of claim 16 wherein enabling the vehicle seat occupancy alert device comprises actuating an ON/OFF switch on the vehicle seat occupancy alert device to the ON position.

18. The method of claim 17 wherein enabling the vehicle seat occupancy alert device further comprises plugging a power plug connected to the vehicle seat occupancy alert device into an accessory outlet in the vehicle.

19. The method of claim 15 wherein placing a portable, self-contained vehicle seat occupancy alert device on a vehicle seat comprises placing a pad of the alert device against the front surface of the back portion of the vehicle seat, and hanging a counterweight connected to the pad by straps over the rear surface of the back portion of the vehicle seat.

20. The method of claim 15 wherein placing a portable, self-contained vehicle seat occupancy alert device on a vehicle seat comprises placing vehicle seat occupancy alert device on the seat portion of the vehicle seat.

* * * * *